United States Patent
Yale

[11] Patent Number: 5,271,638
[45] Date of Patent: Dec. 21, 1993

[54] TRUCK STEERING STABILIZER

[76] Inventor: Donald M. Yale, 806 E. Lake Dr., Gladewater, Tex. 75647

[21] Appl. No.: 930,997

[22] Filed: Aug. 17, 1992

[51] Int. Cl.⁵ ............................................. B60G 11/46
[52] U.S. Cl. ...................... 280/712; 280/718
[58] Field of Search ............ 280/712, 711, 718; 188/299

[56] References Cited

U.S. PATENT DOCUMENTS

| | | | |
|---|---|---|---|
| Re. 23,704 | 9/1953 | De Lay | 280/712 |
| 3,063,732 | 11/1962 | Harbers et al. | 280/712 |
| 3,133,745 | 5/1964 | Granning | 280/711 |
| 3,285,281 | 11/1966 | Pribonic et al. | 280/712 |
| 4,919,399 | 4/1990 | Selzer et al. | 280/718 |
| 5,024,462 | 6/1991 | Assh | 280/712 |

Primary Examiner—Eric D. Culbreth
Attorney, Agent, or Firm—Robert Nisbett

[57] ABSTRACT

This invention provides an apparatus and method of improving the ride, handling and steering characteristics of the tractor unit of a tractor-trailer rig or a truck which is used to haul loads over highways. The apparatus includes an air bellows spring located directly over the leaf spring of said truck between the steering-wheels axle and the rear shackle of the leaf springs. The air bellows spring is designed and located to apply a manually adjustable force to the leaf springs without creating any torque about the longitudinal axis of the leaf spring.

10 Claims, 3 Drawing Sheets

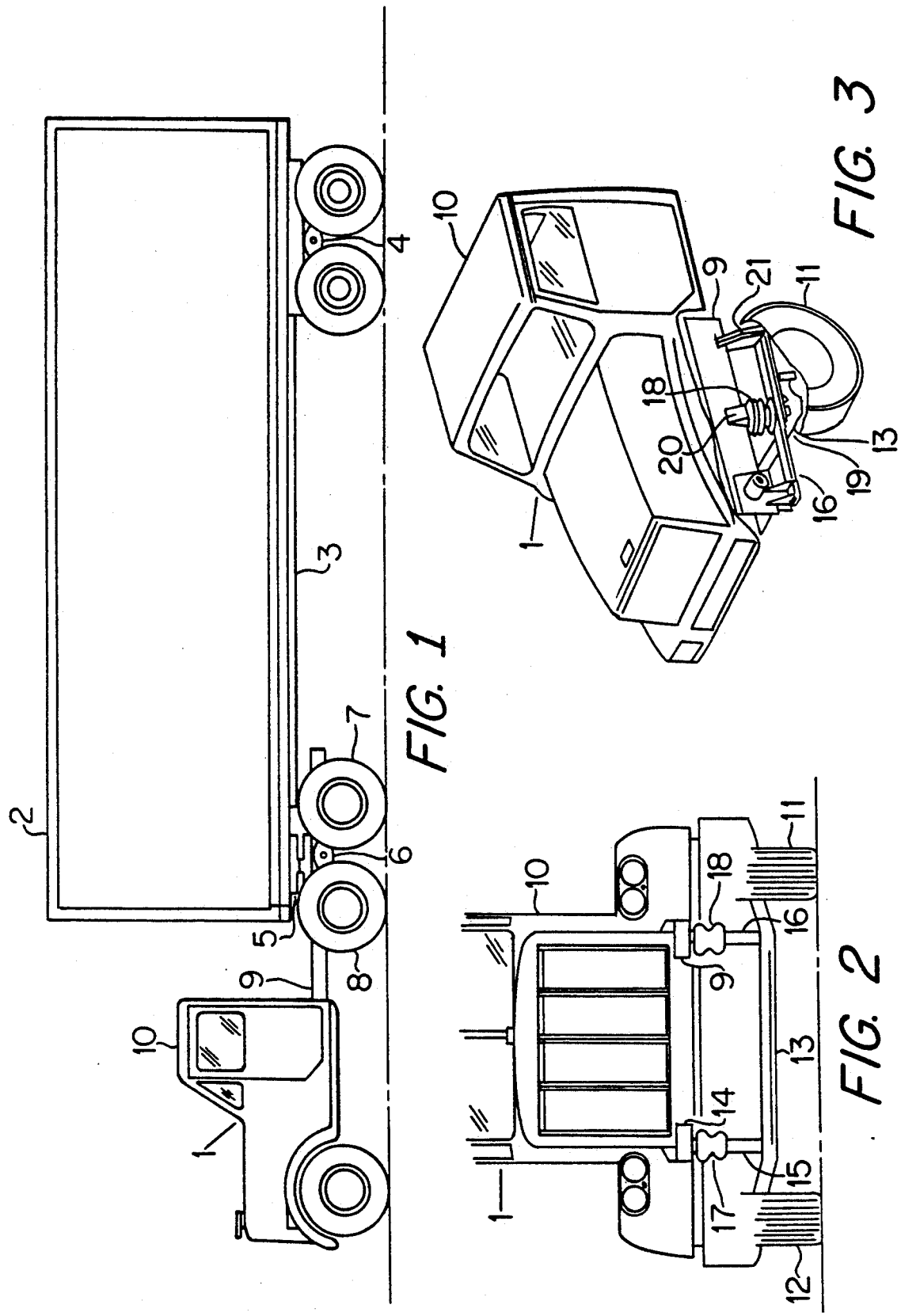

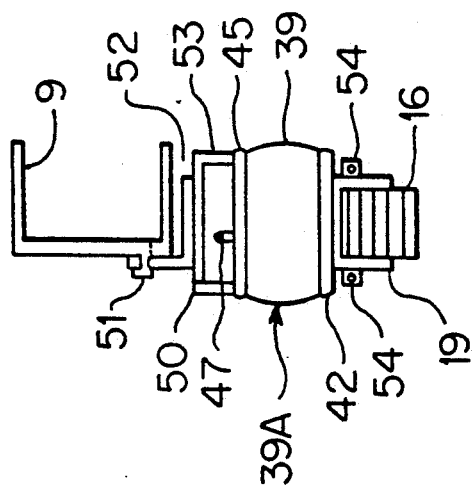
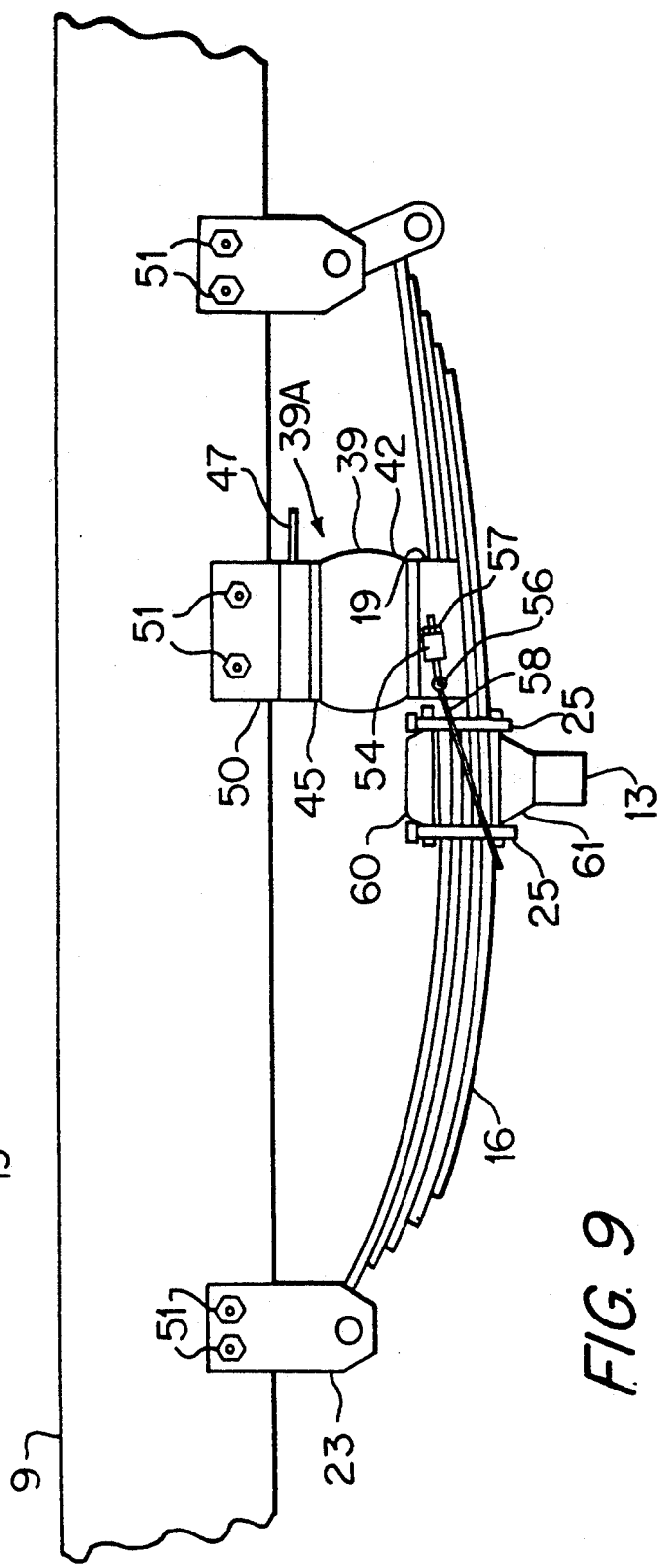

TRUCK STEERING STABILIZER

BACKGROUND OF THE INVENTION

The invention of this application relates to the use of an adjusting device which operates through a connection to the leaf spring of the front steering wheels and the frame of a tractor unit to provide optimum ride, handling and steering characteristics for a truck comprising a trailer and tractor unit.

PRIOR ART

Numerous patents show variations in various attempts to provide more verstile suspension systems for vehicles used on roadways and some of those illustrate the use of air inflated type springs or boosters. Such typical patents are listed as follows:

| U.S. Pat. No. | Inventor | Issue Date |
| --- | --- | --- |
| 1,470,424 | T. W. E. Brogden | Oct. 9, 1923 |
| 1,714,067 | W. N. Angelus | May 21, 1929 |
| 1,858,783 | A. F. Masury | May 17, 1932 |
| 1,880,703 | T. C. Bischoff et al | Oct. 4, 1932 |
| 1,920,206 | A. F. Masury | Aug. 1, 1933 |
| 1,957,072 | A. F. Masury | May 1, 1934 |
| 2,109,074 | R. W. Wilsson | Feb. 22, 1938 |
| 2,141,781 | LeRoy V. Adler | Dec. 27, 1938 |
| 2,150,622 | N. E. Hendrickson | Mar. 14, 1939 |
| 2,190,311 | M. E. Dayton | Feb. 22, 1938 |
| 2,227,762 | A. Ronning | Jan. 7, 1941 |
| 2,317,057 | T. A. Higby | April 20, 1943 |
| 2,236,734 | A. Ronning | April 1, 1941 |
| 2,566,393 | O. J. Wolfe | Sept. 4, 1951 |
| 2,874,956 | D. J. La Belle | Feb. 24, 1959 |
| 2,989,300 | P. Johannsen | June 20, 1961 |
| 3,053,548 | J. C. Moore | Sept. 11, 1962 |
| 3,179,439 | R. N Janeway | April 20, 1965 |
| 3,399,795 | R. V. Clacker et al | Sept. 3, 1968 |
| 3,462,033 | R. J. Rioch | Aug. 19, 1969 |
| 3,489,427 | S. A. Vearnals et al | Jan. 3, 1970 |
| 3,595,408 | Ira C. Eddy | July 27, 1971 |
| 3,703,244 | D. P. Walsh et al | Nov. 21, 1972 |
| 3,722,948 | D. P. Walsh | Mar. 27, 1973 |
| 3,724,695 | R. S. Taylor | April 3, 1973 |
| 3,730,548 | E. B. Thaxton | May 1, 1973 |
| 3,730,550 | E. B. Thaxton | May 1, 1973 |
| 3,866,894 | P. J. Sweet et al | Feb. 18, 1975 |
| 4,033,607 | J. S. Cameron | July 5, 1977 |
| 4,033,608 | P. J. Sweet et al | July 5, 1977 |
| 4,397,478 | J. R. Jensen et al | Aug. 9, 1983 |
| 4,619,467 | J. W. Lafferty | Oct. 28, 1986 |
| 4,789,369 | W. H. Geno et al | Jan. 17, 1989 |
| 4,919,399 | R. J. Selzer et al | April 24, 1990 |

The above references were found using the invention described herein as a reference point and describe features that might be used with this invention by one skilled in the art using this disclosure; therefore the above patents are incorporated herein by reference for all purposes and specifically to enable one skilled in the art to make and use the invention and to make the best modes apparent as required by 35 U.S.C. Section 112.

SUMMARY OF THE INVENTION

According to this invention, there is provided an improvement in the ride, handling and steering characteristics of the tractor portion of a truck. In one preferred embodiment the device is used with a truck known as an 18-wheeler as shown in FIG. 1. The device can be used with other types of trucks or tractors such as shown as 1 which pull some type of trailer, 2, wherein the trailer connects to the tractor above the rear wheels 7 and 8 so that the tractor frame, 9, bears a portion of the load of the trailer 2, through pivot point connecting device 5. As shown, in the figure the pivot point connecting device 5, is known as a fifth wheel. This type of connector allows the tractor and trailer to pivot and turn in relation to each other, yet transfers the force from the motor powered tractor through the fifth wheel to pull or push the trailer. Typically, the fifth wheel is moveable or adjustable along the frame 9 from a point immediately above the rear drive wheels 7 and 8 to a point forward toward the cab of the truck 10. Moving the fifth wheel forward transfers more of the load of the trailer on the fifth wheel to the front steering wheels 11 and 12. The total amount of load in the trailer 2 affects the ride and handling characteristics of the truck and trailer and especially of the tractor itself. The proportion of the total load on the fifth wheel which is carried by the front steering wheels 11 and 12 also affects the ride and handling characteristics of the vehicle. Typically, the total load of the vehicle and the load on the fifth wheel is determined by the payload in the trailer over which the driver or operator has little control. The load is determined by each job and the load frequently changes over a long haul due to portions of the load being delivered at its destination and additional cargo being loaded at intermediate terminals.

The load distribution from the fifth wheel can be varied by moving the fifth wheel 5 forward to increase the proportion of the load on the front steering wheels 11 and 12 or by moving the fifth wheel rearward to increase the proportion of the load from the fifth wheel 5 on the rear driving wheels 7 and 8. As shown in FIG. 1, the driving wheels 7 and 8 are the left wheels. There are corresponding wheels on the right side the tractor which cannot be seen in the drawing, and these wheels are typically dual or double wheels so that there are typically eight (8) tires or wheels in an arrangement as shown in FIG. 1. Likewise, the wheels at the rear of the trailer 4 have a similar arrangement except they are not driven by a motor. These wheels can also be mounted in tandem or each axle can be mounted or sprung individually. If they are mounted in tandem the axles for wheels shown at 7 and 8 are mounted on a pivoting member 6 which allow the axles to pivot up and down to assist in maintaining all of the wheels on both axles in contact with the ground or pavement.

With the total load on the fifth wheel, 5, varying as the load in the trailer varies, the driving characteristics of the tractor and especially the front steering wheels varies. The quality of the roadway including condition of the pavement, slope, grade, curvature and texture also causes the tractor to be more difficult to steer or control for certain conditions. The front end alignment and ease or difficulty in steering of the tractor will also vary according to the load on the front steering wheels, the reaction mechanics of the front leaf spring and axle in combination and the reference position of the front leaf spring. By reference position is meant the usual position of the springs in relation to the tractor frame when the springs are not moving in response to a rise or dip in the road or in response to acceleration or braking.

This invention can be used with types of trucks other than an 18-wheeler as long as the tractor or pulling portion of the vehicle carries or bears a portion of the load of the front of the trailer. Goose-neck trailers and four wheel truck vehicles are an example. Typically goose-neck trailers are connected to a truck using a ball joint as the pivot point and pulling connection; however, a fifth wheel connection can be used on them also.

Generally this invention provides in a motor vehicle having a tractor portion containing an engine for moving said vehicle and a trailer portion for containing a substantial portion of the vehicle load wherein the said trailer connects to the tractor portion near a set of rear wheels, above said rear wheels and between said rear wheels and a set of front steering wheels by an adjustable pivot point so that a major portion of the connecting load of the said trailer rests on said rear wheels and the portion of said load on said rear wheels can be adjusted by moving said pivot point forward and rearward between said rear wheels and said front wheels, wherein the front steering wheels are attached to the frame of said tractor by a set of leaf springs attached to the frame and an axle bearing said steering wheels, the improvement comprising mounting an adjustable air bellows spring means directly on and above the front leaf spring and directly below the frame of said tractor wherein the air springs bellows is mounted at a point directly above the longitudinal center line of said leaf spring and at a point above said leaf spring between the point of attachment of the axle for said steering wheels and said leaf spring and the rear shackle of said leaf spring, wherein said air bellows air spring is connected to the frame of said tractor directly above the air bellows air spring, and wherein the air pressure can be manually adjusted by the tractor driver so that the air bellows air spring exerts the desired force between the tractor frame and the front leaf spring which desired force can be adjusted by the driver according to the load distribution between the front wheels and rear wheels of said tractor and the road conditions for optimum driving conditions of said tractor.

BRIEF DESCRIPTION OF THE DRAWINGS

FIG. 1 is a side view or elevation of a tractor trailer motor vehicle showing location of the front steering wheels, the driving wheels, the fifth wheel and the trailer components.

FIG. 2 is a front cutaway view of a tractor showing the location of the front steering wheels, axle, frame, leaf springs and air bellows.

FIG. 3 is a cutaway view of the left front quarter of a tractor showing the location of the left front wheel the axle, the leaf spring, mounting brackets and air bellows mounting.

FIG. 8 is a front view of another air spring mounting assembly.

FIG. 9 is a side view of another air spring mounting assembly.

DESCRIPTION OF PREFERRED EMBODIMENTS

Figure 5:
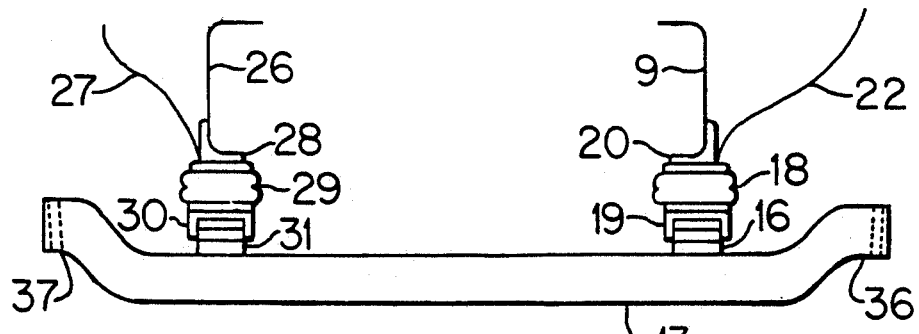
FIG. 5 is a diagram of the front view of the frame and axle arrangement of FIG. 4.
Figure 6:
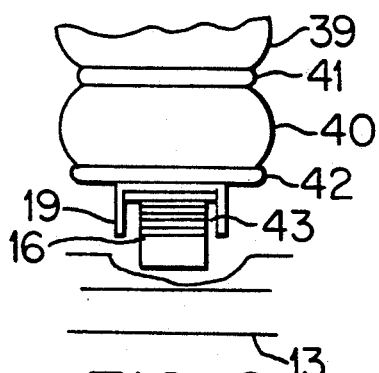
FIG. 6 is a front view of the lower mounting details of an air spring assembly.

The drive stabilizing device of this invention can have several variations as described herein and the preferred features for any given application will depend upon the particular type and design of the tractor on which it is to be used. The total force to be applied by the air spring bellows and the particular mounting position on the leaf spring will determine the size of the air spring bellows required. The range of air pressure to be used with the air spring bellows will also determine the size of the air spring bellows required. The greater the force required from the air spring bellows the greater the effective diameter of the air spring bellows required. The effective diameter is the nominal diameter of the bellows or the diameter of a circle over which the air pressure in the bellows would be applied to produce the force of a particular air bellows. The maximum outside diameter of the air bellows will be larger than the effective or nominal diameter because of the manner and material of construcion of the air bellows. The air bellows 39 and 40 as shown in FIGS. 5 and 6 is preferrably constructed of an elastomeric or rubber like material which will easily flex and deform as the leaf spring 19 moves relative to the frame 9 and it will also flex with the change in air pressure inside the air bellows. The internal air pressure will tend to expand the elastomeric material of the air bellows to some degree. With a higher range of air pressure which can be used inside the air bellows a smaller effective diameter of the air bellows can be used to produce the same force on the leaf spring and frame by the air bellows. Another consideration in selecting the preferred features for the air bellows spring is the clearance between the leaf spring and the truck frame. For a small clearance, a larger effective diameter air bellows would be required to produce a given range of force between the leaf spring and truck frame for a given range of air pressure applied inside the air spring bellows. For a limited clearance, a more restricted or smaller range of air pressure may be necessary to prevent over extension of the leaf spring to provide effective application of a minimum force by the air spring bellows. As shown in FIG. 1 one preferred application or embodiment of this invention is used on a motor vehicle known as an 18-wheeler truck. The motor vehicle has a tractor 1, attached to a trailer 2 by a pivotal connection known as a fifth wheel 5. The fifth wheel 5 is mounted on the frame 9 of the tractor and typically can be adjusted forward from the driven wheels 7 and 8 which can be independently mounted and supported by springs attached to the frame 9 or the driven wheels 7 and 8 can be mounted in tandem on a support which pivots about a central axis at 6. If mounted in tandem the structure and axis at 6 would carry all of the load applied to wheels 7 and 8 by the truck frame 9. The trailer 2 as shown has an enclosed body which is supported by frame 3 which is attached to the rear trailer wheels at 4 through a tandem or pivotable arrangement. An 18 wheeler has dual wheels on each side at each wheel location shown at 7, 8 and 4. For an enclosed trailer such as shown the cargo can be loaded at various locations and unloaded at various locations so that the total load and the weight distribution within the trailer can change at each terminal along a given route which in turn changing the load on the front to the trailer at the fifth wheel 5 and consequently on the driven wheels 7 and 8 and the steering wheels 11. Distribution of the load between the driven wheels 7 and 8 and the steering wheels 11 can be adjusted to a limited degree by moving the fifth wheel 5 forward toward the steering wheels or rearward toward the driven wheels 7 and 8. Moving the fifth wheel 5 forward increases the proportion of the load on the fifth wheel while moving the fifth wheel 5 rearward toward the driven wheels 7 and 8 increases the proportion of the fifth wheel 5 load on the driven wheels. The distribution of this load and the total load on the steering wheels 11 affect the alignment of the front wheels and the driving characteristics of the steering wheels and the tractor 1. While it is not practical to control the total load on the steering wheels or the exact distribution of fifth wheel load between each stop on a truck route, the adjustment device of this invention provides an apparatus and method for improving the ride, handling driving and steering characteristics of such a tractor regardless of the amount of variation in load on the steering wheels. The device also improves driving characteristics due to variations in road conditions. The invention improves the ride and handling characteristics of the vehicle due to the force of the air spring stabilizers applied to the steering axle in a particular manner through the leaf spring without restricting action of the leaf spring and without creating undesireable torques forces on the spring or axle. Location and adjustability of the force applied by the air bellows spring is critical to best performance of the invention and for maximum improvement in handling characteristics.

Figure 4:
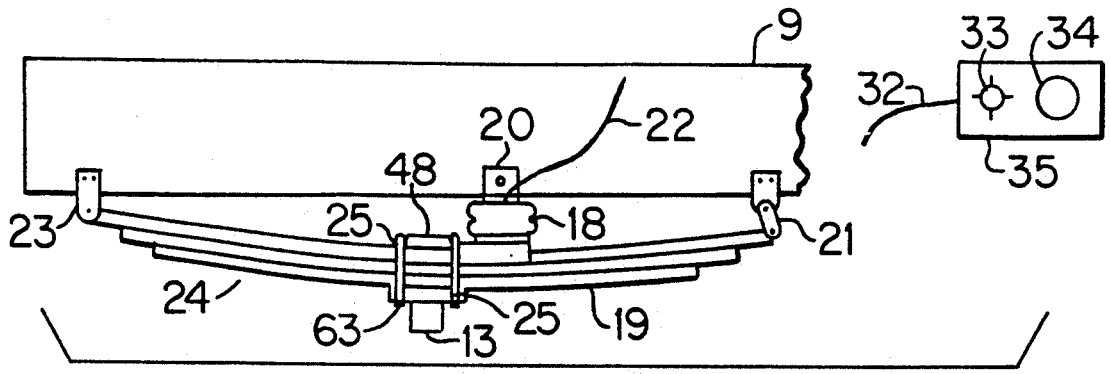
FIG. 4 is a side view of a typical truck frame with leaf spring showing location and connection of the air bellows spring and air supply means.

The relative location of the air spring bellows 17 and 18 are shown in FIGS. 2 and 3. The bellows 17 and 18 are located over the top of leaf springs 15 and 16 respectively and are attached in a vertical line as shown in FIG. 2 to the tractor frame 9 and 14 immediately above the air spring bellows. This mounting over the center line or longitudinal axis of the leaf springs 15 and 16 prevents the stabilizing air bellows springs from creating any torque about the longitudinal axis of the leaf springs. Mounting the air spring at any position than over the center line of the leaf spring 15 and 16 creates torque or rotational forces which create problems with the springs, axle mounts and control of the steering mechanism. As shown in FIG. 3 the air bellows spring of this invention 18 is mounted on the leaf spring in a space beginning immediately to the rear of the steering axle 13 and going approximately one-half (½) of the distance between a verticle center line through axle 13 and the rear spring shackle 21. A preferred range for this space would be from the verticle center line of the axle 13 through one-fourth (¼) of the distance along the leaf spring 16 toward the rear spring shackle 21. A more preferred mounting position for the air spring bellows is adjacent to the steering axle mounting brackets 48 and 60 as shown in FIGS. 4 and 9. In this position the air bellows spring exerts maximum restraining and dampening force to movement of the leaf spring 24 and 16 respectively and maximum benefit is obtained from both the leaf spring 24 and 16 and the air spring bellows 18 and 29. In this position the air bellows 18 and 29 also counteract the torque and front-end dive applied to the axle 13 and leaf spring 24 and 16 when the brakes are applied to rotating front wheels 11 and 12 as shown in FIGS. 1 and 2. Thus, the action of the forces applied by the air bellows springs in 18 and 29 as shown in FIGS. 4 and 5 tend to stabilize or maintain the handling and steering characteristics of the truck front steering axle and wheel alignment system.

In addition to the other actions described herein the stabilizing system of this invention also tends to maintain the front wheel alignment during the vibration and load variations on the front steering axle. The alignments known as caster, toe-in and camber tend to change with changes in load on the steering axle, vibration or bounce of the front axle and with torque of braking when the brakes are applied on the front steering wheels. The air bellows spring system of this invention tend to counter act changes in the front wheel alignment as to the above settings.

Several preferred embodiments are described herein and various features of these embodiments are illustrated in the drawings. From this disclosure and the references cited herein it will be obvious how these features can be used in different combinations and to produce other preferred embodiments.

FIGS. 2 and 3 shows a typical truck 1 or motor vehicle tractor having a cab 10 mounted on top of frame members 9 and 14. The frame members extend from the front of the truck bumper to the rear of the tractor and carry the cab, engine (not shown) and the trailer supporting means such as the fifth wheel 5 shown in FIG. 1. The frame members 9 and 14 are connected to and supported by the drive wheels 7 and 8 and the steering wheels 11 and 12. The wheels are connected to the frame 9 and 14 using some type of spring mechanism which dampens road vibrations and adjust for variations in height in the roadway. The spring mechanism shown in FIGS. 2 and 3 for the front steering wheels is a leaf spring type which as shown in FIGS. 3, 4, and 9 have a fixed pivotable mount or bracket 23 which allows the front of the leaf spring to rotate as the spring flexes allowing the axle 13 and wheels 11 and 12 to move up and down relative to the frame 9 and 14. The longitudinal axis of the leaf spring 16 runs horizontally from the front bracket 23 to the rear shackle 21. The front spring mount or bracket 23 is fixed or secured to the frame 9 by bolts 51. The rear spring shackle 21 is also pivotably attached to the leaf spring 16 at the rear of the spring and pivotably attached to a rear spring mount or bracket 59 which is also fixed to the frame 9 by bolts 51. The pivotable connection at the rear of the leaf spring 16 allows adjustment for changes in length and position of the the rear end of the leaf spring as the leaf spring flexes and rotates about the front pivot mount due to variations in load applied to the front of the truck tractor 1 and due to variations caused by upward and downward movement of wheels 11 and 12 caused by the roadway.

As shown in FIGS. 4 and 9 the leaf spring 16 is attached to the axle 13 of the front steering wheels 11 and 12 by a bracket and clamp mechanism. The axle 13 runs traverse of the truck tractor 1 and the truck frame 9 and 14 and carries wheels 11 and 12 through one of several types of pivotable and adjustable steering mechanisms which are not shown but would attach at points 36 and 37 as shown in FIG. 5. A steering mechanism which is not shown would also attach to wheels 11 and 12 so that the position of these wheels could be controlled to control the path of the truck tractor.

The axle 13 is secured to the leaf springs 16, 24 and 31 using a top bracket 48 and 60 and a bottom bracket 61 secured together and around the brackets and leaf springs by U-bolts 25. These brackets and U-bolts make a rigid and fixed section of the leaf spring 16, 24, and 31 which allows the terminal ends of each leaf to flex and move relative to each other.

The embodiment of the air spring device of this invention as shown in FIGS. 4 and 5 has a double air bellows 18 which is attached to a top mounting plate or bracket 20 and can be attached to frame member 9 by one or more of several methods since due to the design and location of the device the bracket does not carry a great deal of stress. The bracket 20 can be attached to the frame 9 by bolts, by threaded machine screws, by any conventional attachment method or a combination of methods.

The air springs shown in FIGS. 4 and 5 has a lower mounting bracket or saddle 19 and 63 which fits over the top of the leaf spring 16, 24 and 31 yet is moveable and allows the spring and each leaf to move freely and independently. The saddle bracket 19 serves to transmit force from the air bellows downward to the top of the leaf spring without creating additional stress in the leaf spring due to restraint upon movement of the spring, spring leaves or the saddle bracket. The saddle bracket is under practically only compressive forces and therefore requires little force or only very light restraining means to keep it in position on top of the leaf spring such as when a minimal force or minimal air pressure is applied inside the air spring. A simple clamp mechanism (not shown) or a simple cable assembly 54, 56, 57 and 58 in FIG. 9 can be used to retain the saddle bracket in position if desired.

The air bellows 18 and 30 are connected to an air supply means 35 by air lines 22, 27 and 32 by tubular means such as metal, rubber, plastic or a combination of these types of hoses or pipes. The air supply means uses a manual valve 33 and gauge 34 by which the operator or truck driver in the cab 10 can manually adjust the air pressure applied to the air bellows as frequently and in any manner desired. The air source (not shown) is typically a compressor and reservoir driven by the truck engine or an independent power plant. The air supply means 35 is typically located in the cab 10 close to and in a convenient position for the truck driver and receives air through a hose or pipe to the reservoir. The air supply means is designed so that valve 33 sets and maintains a constant pressure on the air bellows which pressure is shown by gauge 34. Air pressure up to about 100 pounds per square inch gauge (psig) can be used in the air bellows of this invention and the air volume requirements are very low.

Figure 7:
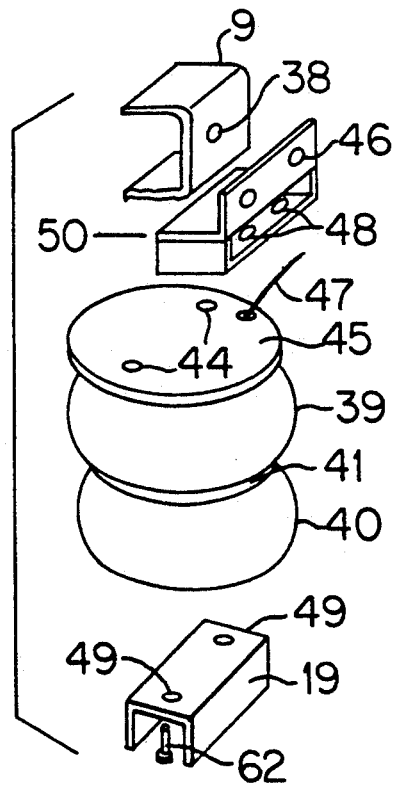
FIG. 7 is an exploded view of an air spring assemble showing the top and bottom mounting brackets.

In FIGS. 4 and 5 air bellows 18 and 29 and mounting brackets 20 and 28 are shown which allow the air lines 22 and 27 to exit through a top plate of the air bellows assembly. This type of air bellows arrangement is also shown in FIG. 7 where the air line 47 passes through a top plate 45 at one side of the plate 45 so that it clears the side of the top mounting bracket 50. The top mounting bracket 50 has an open channel so that it can be removeably secured to the air bellows top plate 45 by using machine screws secured through bolt holes shown at 48 in FIG. 7. The top mounting bracket 50 can be secured to the frame 9 with matching screws or bolts through holes shown at 46 and at 38 in the frame. Likewise the lower mounting bracket or saddle 19 is removeably secured to the air bellows lower plate 42 using machine screws 62 through holes 49. The air bellows 39 and 40 shown in FIGS. 6 and 7 is a double type used where clearance between the leaf spring 16 and frame 9 is not unduly limited. The bellows shown has an optional band 41 which strengthens and reduces outward inflation of the air bellows. The degree of outward inflation and strength of the air bellows is determined by its design, the quality of the elastomeric material and fabric used to make the air bellows. The larger the diameter of the bellows the greater strength required. Typically the air bellows has an effective or nominal inside diameter or I.D. in the range of about three to ten inches and preferably in the range of about 4 to 8 inches.

Normally failure of the air bellows or any component of the system is not a problem or concern because due to the design and location, the system fails in a safe configuration and the steering system and conditions can be quickly returned to the original truck conditions as if the stabilizing system had not been installed on the truck tractor. All that is necessary for the system to be returned to neutral or any effect removed is for the driver operator to reduce the air pressure applied to the air bellows through valve 33. Other types of air adjustable mechanisms such as air cylinders which are slideably adjustable concentric cylinders made of metal or some other fairly rigid material sealed at the edges either by slideable seals or an elastomeric skirt can also by used for some applications. For the preferred elastomeric type of air bellows spring the preferred operating range for the air pressure is 5-75 psig. For the metal or rigid side cylinder type air springs the operating range could be higher such as 10-100 psig.

In FIGS. 8 and 9 another type of air spring bellows 39 A and upper mounting bracket 50 is shown. The air bellows is a single bellows type for more restricted clearance applications. The upper mounting bracket 50 is designed for an application where the air spring bellows 39A or the truck frame 9 would restrict clearance of the air inlet line 47. The top mounting bracket is designed with a channel 54 so that the air connection 47 passes upwardly through the base of the bracket which is attached to the top air bellows plate 45. The top bracket 50 has an angle mount 52 which conforms to and attaches to the frame 9 and is secured by some means such as a bolt or a machine screw at 51. The lower air bellows bracket or saddle 19 is attached to the lower or bottom air bellows plate 42. The saddle rests on top of the leaf spring 16. The saddle can be sized to fit over the leaf spring tightly as shown in FIG. 8 or it can be loosely fitted to the leaf spring as shown in FIG. 6. With either type of fit, a cushion material can optionally be used as shown at 43 in FIG. 6. In FIG. 9 the lower bracket or saddle 19 is loosely secured to the leaf spring by a cable clamp mechanism. A clamp housing or sleeve 54 is attached to the outer side of the saddle such as by welding. An eye bolt 56 with an adjusting nut 57 are secured through the sleeve 54. A cable or metal rod clamp or bracket 58 is secured to the eye bolts 56 on each side of the saddle and looped or passed around the axle brackets and U-bolts clamped to the leaf spring. The saddle is secured to the leaf spring 16 by tightening the nuts 57 on the eye bolts 56. In FIG. 9 the front spring mounts 23 and rear leaf spring mount 59 are secured to frame 9 spring bracket by bolts 51. The lower air spring bracket or saddle 19 can be sized in length to allow the air spring bellows 39A to be mounted adjacent and close to the axle bracket 60 as shown in FIG. 9. The saddle 19 can be of an extended length as shown in FIG. 4 so that the air spring bellows can still be secured to the axle bracket assembly 48 but the air spring is located more remotely from the axle bracket 48 so that the air bellows 18 applies force to the leaf spring 24 at a distance from the axle bracket. This distance is preferably in the range of up to one-half or more preferably ¼ of the distance from the axle bracket to the rear spring shackle.

In view of this disclosure, other variations, preferred embodiments and applications of this invention will be obvious to one skilled in the art.

I claim:

1. In a truck tractor and trailer motor vehicle wherein the trailer is attached to the tractor by a connecting device and said tractor has a cab for a driver mounted on a frame and front steering wheels attached to said frame by a steering axle attached to said frame by a set of leaf springs with each leaf spring being mounted to said frame by a front fixed pivotable mount which allows the said leaf spring to rotate and thereby to move up and down relative to said frame at said front fixed mount, wherein a longitudinal axis of the leaf spring runs horizontally from the front pivotable mount to the rear of said leaf spring where said leaf spring is pivotably attached to a rear spring shackle which is pivotably attached to a rear fixed mount which allows for movement of the position of the rear end of the said leaf spring;

a means for adjusting the ride, handling and steering characteristics of said truck tractor vehicle comprising:
   an air bellows spring means located on and above each of said leaf springs between the leaf spring and the frame of said tractor in a space beginning immediately to the rear of said steering axle;
   wherein said air bellows spring means is mounted on top of said leaf spring using a saddle bracket which is a U-shaped plate which fits over the top of said leaf spring with an outer side plate of said saddle bracket fitted to the side of said leaf spring so that said saddle bracket is slideably moveable on said leaf spring and where said saddle bracket extends a predetermined distance along the top of said leaf spring in a space beginning immediately to the rear of the steering axle and going approximately one half of the distance between a vertical center line through the axle and the rear spring shackle;
   wherein the top of said air bellows spring means is secured to the frame above the vertical center line of said air bellows spring means by an upper mounting bracket;
   wherein said air bellows spring means is connected to an air supply means through a manually adjustable pressure adjustment means which can be adjusted by the driver inside the cab.

2. A means for adjusting the ride, handling and steering characteristics of a vehicle of claim 1 wherein said saddle bracket is a rigid plate extending along the top of and resting on said leaf springs and said plate has a vertical flange extending downwardly along each side of said leaf spring a predetermined distance.

3. A means for adjusting the ride, handling and steering characteristics of a vehicle of claim 1 wherein said saddle bracket is positioned immediately adjacent said steering axle.

4. A means for adjusting the ride, handling and steering characteristics of a vehicle of claim 1 wherein said saddle bracket is loosely and slideably secured by a restraining means.

5. A means for adjusting the ride, handling and steering characteristics of a vehicle of claim 1 wherein said air bellows spring means has a diameter in the range of about three to ten inches.

6. In a motor vehicle wherein the truck comprises a portion having a frame on which an engine and cab for a driver are mounted wherein a front steering axle is mounted on said frame and attached to said frame by a set of leaf springs with said front steering axle having a set of steerable wheels attached thereto wherein each of said leaf springs is attached to said frame at the front of said leaf springs by a fixed pivotable mount and wherein each of said leaf springs is pivotably attached to said frame at the rear of said leaf spring by a rear spring shackle which allows for movement of the rear end of said leaf spring;

an improvement for adjusting the ride, handling and steering characteristics of said vehicle comprising:
   an adjustable air bellows spring means mounted on and above each of said leaf springs with a saddle bracket which is a U-shaped plate which fits over the top of said leaf spring and wherein said plate has an outer side fitted to the side of said leaf spring so that said saddle bracket is slideably mounted on said leaf spring in a space on top of said leaf spring beginning immediately to the rear of said steering axle and going approximately one half the distance between a vertical center line through the axle and the rear spring shackle, wherein said saddle bracket is loosely and slideably secured by a restraining means;
   wherein the top of said air bellows spring means is secured to the frame above the vertical center line of said air bellows spring means by an upper mounting bracket;
   wherein said adjustable air bellows spring means is connected to an air supply means through a manually adjustable pressure adjustment means which can be adjusted in the cab by the driver to supply the desired air pressure to said adjustable air bellows spring means.

7. A means for adjusting the ride, handling and steering characteristics of a vehicle of claim 6 wherein said saddle bracket is a rigid plate extending along the top of and resting on said leaf springs and said plate has a vertical flange extending downwardly along each side of said leaf spring a predetermined distance.

8. A means for adjusting the ride, handling and steering characteristics of a vehicle of claim 6 wherein said saddle bracket is positioned immediately adjacent said steering axle.

9. A means for adjusting the ride, handling and steering characteristics of a vehicle of claim 6 wherein said saddle bracket is loosely and slideably secured by a restraining means.

10. A means for adjusting the ride, handling and steering characteristics of a vehicle of claim 6 wherein said air bellows spring means has a diameter in the range of about three to ten inches.

* * * * *